United States Patent [19]

Shook

[11] Patent Number: 4,995,753
[45] Date of Patent: Feb. 26, 1991

[54] SADDLE SUPPORT FOR BICYCLES, MOTORCYCLES, AND THE LIKE

[75] Inventor: William B. Shook, Bremen, Ohio
[73] Assignee: Thurston, Inc., Columbus, Ohio
[21] Appl. No.: 560,066
[22] Filed: Jul. 27, 1990
[51] Int. Cl.$^5$ ............................................. F16D 1/00
[52] U.S. Cl. ................................... 403/24; 403/391; 297/195
[58] Field of Search .................. 403/24, 391; 297/195

[56] References Cited

U.S. PATENT DOCUMENTS

| | | |
|---|---|---|
| 624,232 | 5/1899 | Marty, Jr. . |
| 661,620 | 11/1900 | Rumbarger . |
| 693,159 | 2/1902 | Rumbarger . |
| 1,037,287 | 9/1912 | Mesinger . |
| 1,045,999 | 12/1912 | Mesinger . |
| 2,186,483 | 1/1940 | Guidetti . |
| 3,891,333 | 6/1975 | Corderac'k ................ 297/195 X |
| 3,992,054 | 11/1976 | Campagnolo .............. 297/195 |
| 4,142,813 | 3/1979 | Laborde ..................... 403/391 |
| 4,440,440 | 4/1984 | Juy ............................ 297/195 |
| 4,502,811 | 3/1985 | Patriarca ................... 297/195 X |
| 4,693,627 | 9/1987 | Borromeo .................. 403/24 |
| 4,850,733 | 7/1989 | Shook . |

OTHER PUBLICATIONS

American Classic Equipment, Inc. Bulletin.

Primary Examiner—Andrew V. Kundrat
Attorney, Agent, or Firm—William V. Miller; Sidney W. Millard

[57] ABSTRACT

A clamping means for clamping the wires of a saddle to the upper end of a support post of a bicycle frame or the like. It consists of a lower cradle support clamping member and a cooperating upper clamping member which are mounted on the post to permit tilting of the saddle. The clamping members are so designed that they can be extruded from metal with a post-receiving socket at the lower side of the lower member. This socket, because the lower member is extruded, has a flat inner wall and side walls extending linearly in spaced relationship, with the side walls being at sharp angles to the inner flat wall to provide sharp corners for engaging the sides of the post at a fulcrum formed thereon to prevent lateral displacement of the lower cradle support on the post.

7 Claims, 2 Drawing Sheets

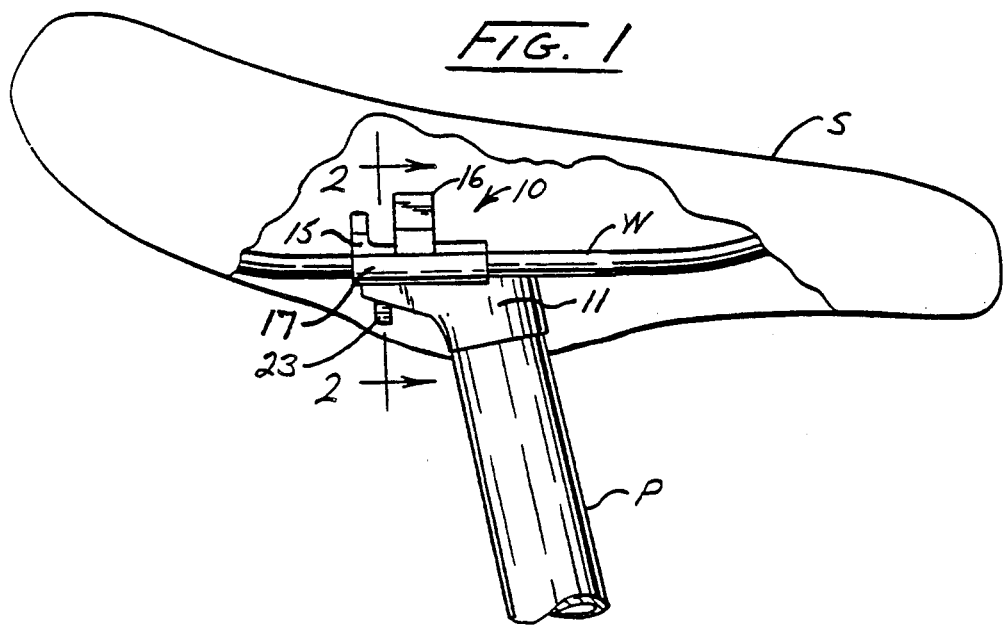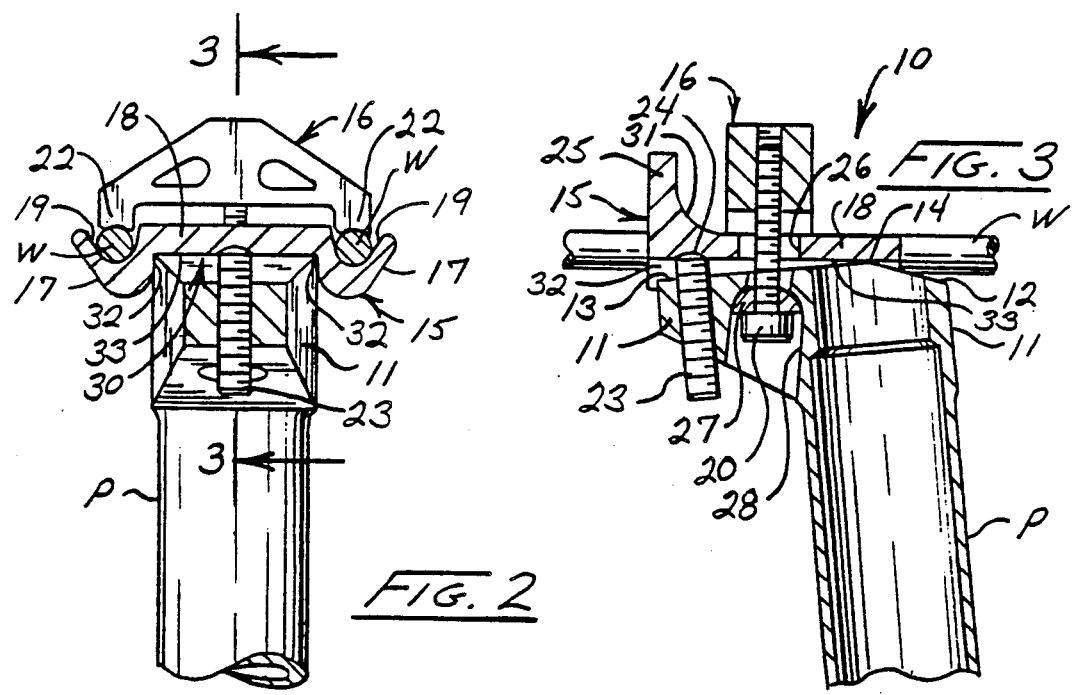

SADDLE SUPPORT FOR BICYCLES, MOTORCYCLES, AND THE LIKE

BACKGROUND OF THE INVENTION AND PRIOR ART

This invention relates to the clamping means for mounting a saddle or seat of a bicycle or the like on the support post of the bicycle frame. It relates more specifically to the lower support or cradle member of the clamping means which is so designed that it can be formed as an extrusion to secure and support the wires of the saddle or seat to accurately locate the wires in parallel relationship to maintain the proper function of the saddle. In the prior art this cradle plate of the clamping means is made by stamping, casting, or forging but prior art cradle designs cannot and do not use linear extrudable shapes. The design of the cradle member of the wire clamping means according to this invention makes possible the use of an extruded member and the extrusion produces linear post engaging surfaces and linear wire-engaging surfaces. This member locates the wires in parallel relationship and clamps them in that relationship to insure proper functioning of these wires and holds the seat on the post for proper functioning of the seat overall.

A stamped cradle plate is the most common in use in the prior art. The major difference between the prior art stamped cradle plate and the extruded cradle member of this invention is that the socket for the post of the stamped cradle plate does not extend symmetrically or linearly forward and rearward of the fulcrum point on the post. In the stamped version a somewhat triangular socket is formed with the flat inner socket surface between the fulcrum line and the contact point of the tilt adjustment screw. The stamped version is of almost uniform thickness but the extruded version provides for variable thickness as desired for structural reinforcement in critical areas.

BRIEF DESCRIPTION OF THE DRAWINGS

The best mode contemplated in carrying out this invention is illustrated in the accompanying drawings in which:

FIG. 1 is a side elevational view partly broken away, showing a saddle or seat mounted on a support post in accordance with this invention;

FIG. 2 is an enlarged transverse vertical sectional view taken along line 2—2 of FIG. 1;

FIG. 3 is a vertical sectional view taken along line 3—3 of FIG. 2;

DETAILED DESCRIPTION OF THE INVENTION

Figure 4:
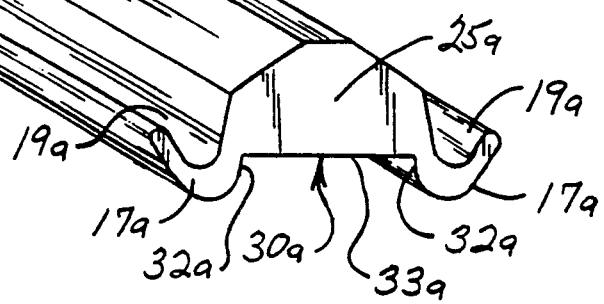
FIG. 4 is a perspective view showing an extruded strip used in making the lower cradle support member of a clamp used in gripping the wires of a saddle.

With specific reference to the drawings, FIG. 1 shows a seat or saddle S of a suitable type supported on the upper end of a post p The seat has the usual longitudinally extending wires W which are clamped to the post by the support and clamping unit of this invention which is designated generally by the numeral 10.

The post P is of annular tubular form but has a formation at its upper end or top which permits clamping the saddle S thereto for forward or rearward tilting adjustment. This formation includes a forward radial extension 11 which has an angular forwardly inclined upper surface 12. Behind the surface 12, the top of the post P has rearwardly inclined edge 13. These angles 12 and 13 are not the same, measured from the centerline of the post, for the front and the back of the post, and produce a transverse, pivot or fulcrum line 14 about which the saddle support and clamping unit 10 can rock in tilting the saddle forwardly or rearwardly.

The unit 10 of this invention for adjustably supporting the saddle S for forward and rear tilting movement comprises the lower cradle and clamping member 15 and the upper cooperating clamping member 16. The member 15 has the parallel longitudinally-extending wire-receiving channel formations 17 located laterally at each side of a flat body 18. The formations 17 provide the upwardly-opening channels or cradles 19 for receiving the wires W. The body 18 rests on the fulcrum 14 and is held downwardly thereagainst by a bolt 20. This bolt is passed upwardly through the post extension 11 and is tapped into the transverse body 21 of the upper clamp member 16. This member 16 has parallel wire engaging lugs 22 which are located to engage the wires W when they are in the cradles 19 of the lower clamp and support member 15. The extremities of lugs 22 are preferably notched to engage the wires. The bolt 20 when properly adjusted will pull the upper clamp 16 downwardly against the lower cradle and support member 15 to clamp the wires W in the cradles 19 and to hold the cradle 15 against the fulcrum line 14. Adjustment of the cradle 15 about the fulcrum 14 is accomplished by means of a bolt 23 threaded upwardly through the post extension 11, the upper end of which engages a dimple 24 in the lower side of the cradle 15 at its forward end. It will be noted that at this forward end the cradle 15 has a heavy lug formation 25 upstanding from the flat body 18 to give it strength to prevent transverse bending. It will also be noted that the bolt 20 extends upwardly through an enlarged bore 26 in the body 18 and that the head of the bolt 20 carries a spherical washer 27 which engages a complemental surface at the upper end of a downwardly-opening socket 28 formed in the extension 11 for receiving the bolt head. It will be apparent that adjustment of bolt 23 will result in tilting of the member 15 about the fulcrum 14 and resultant tilting of the saddle S forwardly or rearwardly on the post P at the fulcrum 14 in contact with flat socket surface 30.

It will be noted that the wire-receiving formations 17 depend below the flat body 18 of cradle 15 and that they are disposed in exact parallel relationship. Between them they provide a downwardly-opening post receiving socket for receiving the upper end of the post P at the fulcrum line 14. It will also be noted that the heavy lug formation 25 is joined to the flat body 18 at a gradually curved surface 31 to provide thickness at this joint for strength. Although the body 18 is shown of uniform thickness it can have variable thickness as desired for structural reinforcement in critical areas.

The design of the cradle and support member 15 makes it possible to produce it as an extrusion from aluminum or other suitable metal or alloy. Forming by an extrusion method to produce precise linear surfaces results in the production of a cradle member 15 which has accurately located linear surface and especially at the walls of the forwardly and rearwardly extending post-receiving socket 30 which are at sharp angles, preferably right angles, so as to engage the top of the post in such a manner as to prevent transverse shifting as indicated in FIG. 2. It will be noted from FIG. 5 that each wall 32 is at a right angle to the flat inner wall 33 of the socket. Although this right angular relationship is preferred, a sharp angular relationship sufficient to capture the post in the socket is suitable. For example an obtuse angle up to about 135°. Extrusion is an economic method of producing the member 15 with the desired linear surfaces accurately located.

Figure 5:
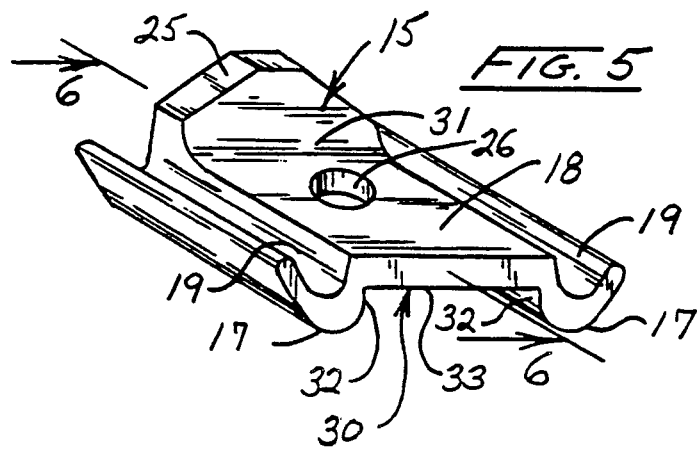
FIG. 5 is a perspective view of the lower clamp member produced from said extruded strip.
Figure 6:
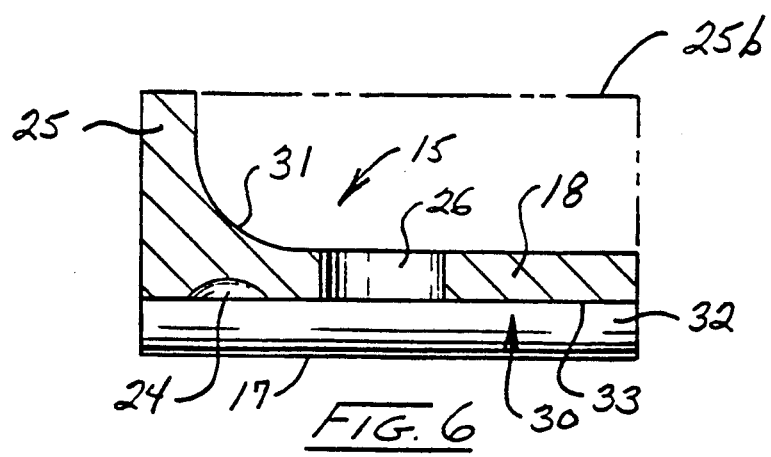
FIG. 6 is a sectional view taken along line 6—6 of FIG. 5.

FIGS. 4 to 6 illustrate how this member 15 may be produced. The first step is to extrude the elongated strip 15a with the continuous socket groove 30a downwardly-opening at its lower side and with the heavy upstanding body 25a. The wire-receiving channel formations 17a are produced at each side with the continuous wire cradles 19a formed therein. It will be noted that the sides 32a of the longitudinally extending socket groove 30a are at a sharp angle relative to the flat inner wall 33a of the socket groove.

From the strip 15a suitable lengths are cut to produce the members 15, one of which is illustrated in FIG. 6. This relatively thick blank is then machined to remove a section of material 25b as indicated by the broken lines. This results in the production of the member 15 with the flat body 18 and the upstanding end lug 25, the two being joined at curve 31. However the body 18 could be of variable thickness. The opening 26 may then be drilled through body 18 and the dimple 24 may then be formed in its lower surface.

The upper clamp member 16 may be extruded in a similar manner and will have the clamping wire-engaging lugs 22 accurately located. It is extruded as a simple strip and then cut into desired lengths.

When member 15 is applied to the upper end of the post P, the end of the post will fit tightly in the socket 30 as shown in FIG. 2. The linearly extending surfaces 32 and 33 of the socket will provide sharp corners for engaging the post at diametrically opposed points to prevent transverse shifting of the member 15 thereon but will permit forward and rearward adjustment of the member 15 on the post. Thus, adjustment of the saddle S will be permitted without lateral displacement of the wires W to detract from proper functioning of the saddle.

It will be apparent from the above that a saddle or seat support assembly has been provided which will properly support the seat for forward and rearward tilting on the post but will prevent transverse shifting on the post. The support grips the saddle wires and holds them precisely in parallel positions relatively. The cradle member can be produced accurately by a simple extrusion method, so as to obtain the desired post receiving socket extending the full length thereof forwardly and rearwardly of the fulcrum with its walls disposed at sufficiently sharp angles to capture the post in the socket and prevent transverse shifting on the post.

I claim:

1. A saddle support for bicycles or the like adapted to support a saddle on the upper end of a bicycle frame support post of tubular form comprising a pair of clamping members adapted to grip the wires of the saddle and maintain them in their original relationship, said pair of clamping members including an upper clamping member and a lower cradle support member having a pair of cradles for receiving the wires, said upper member engaging the wires and clamping them in the cradles, said lower cradle support having a downwardly-opening post-receiving socket extending linearly forwardly and rearwardly thereof, said socket having a flat inner wall, a transverse fulcrum formed on said post at its upper end engaging said flat wall, and said socket having forwardly and rearwardly linearly extending side walls which are at sharp angles to the said flat inner wall for cooperating with the sides of the post at said fulcrum to prevent transverse shifting thereof, and means for tilting said lower support member about said fulcrum to thereby tilt the saddle forwardly or rearwardly, said linearly extending side walls of the socket being at obtuse angles relative to the flat inner wall, said upper clamping member being extruded to form a body with depending laterally spaced lugs which engage said wires and hold them in said cradles of said lower member, said means for tilting said lower support comprises a screw carried by the upper end of the post for engaging the flat inner wall of the socket to move it about said fulcrum, and a bolt carried by the upper end of the post which clamps the upper and lower members together and holds the lower member in contact with said fulcrum for tilting movement.

2. A saddle support according to claim 1 in which the linearly extending side walls of the socket are at right angles relative to the flat inner wall.

3. A saddle support according to claim 1 in which the cradle support member is extruded from metal to provide linear surfaces which form said flat inner wall and said side walls which extend the length of said socket.

4. A saddle support according to claim 1 in which the cradle member has a flat body with said socket formed at its lower side and an upstanding strengthening lug formation at its upper side joined to the flat body by a curved joint.

5. The method of making a support and clamping member adapted to be mounted on the upper end of a bicycle saddle support post comprising extruding a strip from metal to form an elongated strip having a body with wire-receiving cradles in parallel relationship at each side thereof and with a longitudinally extending post-receiving socket at its lower side, said socket having a flat inner wall and side walls extending linearly in parallel laterally spaced relationship, said side walls being at sharp angles relative to said flat inner wall, said body being machined to provide an upstanding transverse strengthening lug at a rear end extending upwardly from a flat body which has said socket in its lower surface extending from said rear end forwardly to a forward end and open at both ends.

6. The method of claim 5 in which said side walls are at right angles to said flat inner wall.

7. A saddle support for bicycles or the like adapted to support a saddle on the upper end of a bicycle frame support post of tubular form comprising a pair of clamping members adapted to grip the wires of the saddle and maintain them in their original relationship, said pair of clamping members including an upper clamping member and a lower cradle support member having a pair of cradles for receiving the wires, said upper member engaging the wires and clamping them in the cradles, said lower cradle support having a downwardly-opening post-receiving socket extending linearly forwardly and rearwardly thereof, said socket having a flat inner wall, a transverse fulcrum formed on said post at its upper end engaging said flat wall, and said socket having forwardly and rearwardly linearly extending side walls which are at sharp angles to the said flat inner wall for cooperating with the sides of the post at said fulcrum to prevent transverse shifting thereof, and means for tilting said lower support member about said fulcrum to thereby tilt the saddle forwardly or rearwardly, said linearly extending side walls of the socket being at obtuse angles relative to the flat inner wall, said means for tilting said lower support comprises a screw carried by the upper end of the post for engaging the flat inner wall of the socket to move it about said fulcrum, and a bolt carried by the upper end of the post which clamps the upper and lower members together and holds the lower member in contact with said fulcrum for tilting movement.

* * * * *